US008987949B1

(12) United States Patent
Chui

(10) Patent No.: US 8,987,949 B1
(45) Date of Patent: Mar. 24, 2015

(54) LINEAR REGULATOR WITH MULTIPLE OUTPUTS AND LOCAL FEEDBACK

(75) Inventor: Siew Yong Chui, Singapore (SG)

(73) Assignee: Marvell International Ltd. (BM)

( * ) Notice: Subject to any disclaimer, the term of this patent is extended or adjusted under 35 U.S.C. 154(b) by 762 days.

(21) Appl. No.: 13/219,124

(22) Filed: Aug. 26, 2011

Related U.S. Application Data

(60) Provisional application No. 61/384,007, filed on Sep. 17, 2010.

(51) Int. Cl.
*H02J 9/00* (2006.01)

(52) U.S. Cl.
USPC .......................................... 307/155; 307/31

(58) Field of Classification Search
CPC ..... H01L 2223/00; G05F 1/575; G05F 1/565; G05F 1/56
USPC .................................................. 307/31, 155
See application file for complete search history.

(56) References Cited

U.S. PATENT DOCUMENTS

| | | | | |
|---|---|---|---|---|
| 7,851,940 B2 * | 12/2010 | Mahin et al. | .................... | 307/11 |
| 2005/0127756 A1 * | 6/2005 | Shepard et al. | ................. | 307/18 |
| 2007/0097574 A1 * | 5/2007 | Mahin et al. | .................... | 361/90 |
| 2008/0252372 A1 * | 10/2008 | Williams | ...................... | 330/251 |

* cited by examiner

*Primary Examiner* — Daniel Cavallari

(57) ABSTRACT

A linear regulator includes a first drive voltage output to drive an analog load, a second drive voltage output to drive a digital load, and a third output to provide a clean source of current. Circuit elements that produce the respective drive voltages may be isolated from each other. In addition, local feedback may be included to compensate for wide swings in circuit loading conditions in the analog load and in the digital load.

20 Claims, 7 Drawing Sheets

LINEAR REGULATOR WITH MULTIPLE OUTPUTS AND LOCAL FEEDBACK

CROSS REFERENCE TO RELATED APPLICATIONS

The present disclosure claims priority to U.S. Provisional App. No. 61/384,007 filed Sep. 17, 2010, and is incorporated herein by reference in its entirety for all purposes.

BACKGROUND

The present disclosure relates to supplying power in a mixed signal integrated circuit (IC), and in particular to linear regulator for mixed signal ICs.

Unless otherwise indicated herein, the approaches described in this section are not prior art to the claims in this application and are not admitted to be prior art by inclusion in this section.

An integrated circuit (IC) that has both analog circuits and digital circuits on a single semiconductor die is commonly referred to as a mixed signal IC. In a mixed signal IC, the digital circuitry typically operates at a high frequency and the analog circuitry operates at DC or a relatively lower frequency as compared to the digital load. The fast-changing digital signals can send noise to the analog circuitry. One path for this noise can occur in the power supply section of the IC. The power supply section should exhibit immunity to noise transients that may arise when the analog and digital circuitry are driven. A common approach is to provide separate drive voltages for the analog circuitry and for the digital circuitry. The power supply section typically provides a current source that is proportional to bandgap voltage. Since the current source may be used for biasing or to produce a reference, the current source should also be as noise-free as possible.

FIG. 1 shows a typical configuration for a power supply section in a mixed signal IC. A first operational transconductance amplifier (OTA) 12 is configured with two source followers N1, N2. An output current of the OTA 12 sets up a voltage $V_{G\_BIAS}$ across output capacitor C1 that serves to bias transistors N1, N2. Accordingly respective drive voltages $V_{2.5\_ANA}$, $V_{2.5\_DIG}$ serve as separate drive voltages for respective analog and digital circuitry, represented in the figure as "loads". The resistor network R1 and R2 are typically configured to produce drive voltages $V_{2.5\_ANA}$, $V_{2.5\_DIG}$ on the order of 2.5 V.

During operation, the loading conditions in the analog circuitry or the digital circuitry may affect the drive voltages. For example, loading in the analog circuitry may suddenly increase, causing a sudden drop in the voltage level across the capacitor CL1 and bringing $V_{2.5\_ANA}$ below an acceptable value. A similar occurrence may arise for the digital circuitry. If the level for $V_{2.5\_DIG}$ falls below a threshold value, the digital circuitry may go into a sleep state or turn off completely. A possible solution is to place a large capacitor Cx to buffer variations in $V_{G\_BIAS}$. However, such a capacitor may have a prohibitively large capacitance.

Digital circuitry present an additional concern. Logic gates in the digital circuitry may generate considerable switching noise during operation. These noise transients may be coupled back to the gate of transistor N2 through an action known as "charge coupling." Since the transistor N2 operates as a voltage driver, the device must have relatively large physical dimensions in order to source sufficient current to operate properly. However, the overlap of the gate electrode with the source/drain electrodes in a large dimension device may result in significant capacitive coupling between the gate and the source (CGS). Accordingly, any noise transients in the digital logic sensed by the source terminal of transistor N2 may be coupled back to the gate terminal of the transistor and thus influence the $V_{G\_BIAS}$ voltage level that is connected to the gate. Variations in the $V_{G\_BIAS}$ voltage would result in fluctuations in the drive voltage $V_{2.5\_ANA}$, which could adversely affect operation of the analog circuitry.

FIG. 1 also includes a second OTA 14 that is configured with transistors P1 and P2 connected in a current mirror configuration. Output current I of the OTA 14 is proportional to the bandgap voltage $V_{BG}$ and 1/(R3+R4). The output current I drives the current mirror P1/P2, which is powered by a power supply voltage $V_{DD}$, to produce a mirrored current $I_{VBG}$. The current mirror P1/P2 therefore serves as a current source that is proportional to the bandgap voltage. Separating the circuit that serves as the current source (namely, current mirror P1/P2) from the circuit that generates the drive voltages allows for producing a current that exhibits low noise characteristics, although at the cost of space-consuming circuitry. A lower cost alternative is to configure the current mirror P1/P2 with the OTA 12, thus obviating the OTA 14. However, the resulting current source may be more susceptible to noise due to switching transients in the digital circuit.

SUMMARY

In some embodiments, a method in a circuit includes receiving a reference voltage. In an embodiment, the reference voltage may be a bandgap voltage level. A source current that is proportional to the reference voltage may be generated. The source current may then be used to produce a first drive voltage for driving an analog load. A mirrored current may be produced from the source current, and used to control a first transistor produce a second drive voltage for driving a digital load.

In some embodiments, a feedback method may be provided to compensate for changes in the second drive voltage which drives the digital load. Accordingly, the method may further include sensing a voltage of the digital load and further controlling the first transistor in response to the sensed voltage in order to change the level of the second drive voltage.

In some embodiments, the method may further include producing the first drive voltage by mirroring the source current and using the mirrored current to control a transistor to produce the first drive voltage for driving the analog load. The method may further include a feedback method to compensate for changes in the first drive voltage, including sensing a voltage of the analog load and further controlling the transistor in response to the sensed voltage.

In some embodiments, a circuit includes a first circuit having a input for a reference voltage and an output voltage based on the reference voltage. A first source follower may produce a source current responsive to the output voltage. A second circuit may produce a first drive voltage from the source current for driving an analog load. A third circuit may produce a mirrored current from the source current. A second source follower may be controlled by the mirrored current to produce a second drive voltage for driving a digital load.

In some embodiments, a local feedback circuit may be provided to compensate for changes in the second drive voltage which drives the digital load. Accordingly, a circuit may be connected to further control the second source follower to change the second drive voltage depending on a difference between the output voltage of the first circuit and a voltage level of the digital load.

In some embodiments, the second circuit may include a circuit to produce a mirrored current from the source current. A source follower may be controlled by the mirrored current to produce the first drive voltage for driving the analog load. In some embodiments, a local feedback circuit may be provided to compensate for changes in the first drive voltage. Accordingly, a circuit may be connected to further control the source follower to change the first drive voltage depending on a difference between the output voltage of the first circuit and a voltage level of the analog load.

In some embodiments, a current source may be provided based on the source current produced by the first circuit.

The following detailed description and accompanying drawings provide a better understanding of the nature and advantages of the present disclosure.

DETAILED DESCRIPTION

In the following description, for purposes of explanation, numerous examples and specific details are set forth in order to provide a thorough understanding of the present disclosure. It will be evident, however, to one skilled in the art that the present disclosure as defined by the claims may include some or all of the features in these examples alone or in combination with other features described below, and may further include modifications and equivalents of the features and concepts described herein.

Figure 1:
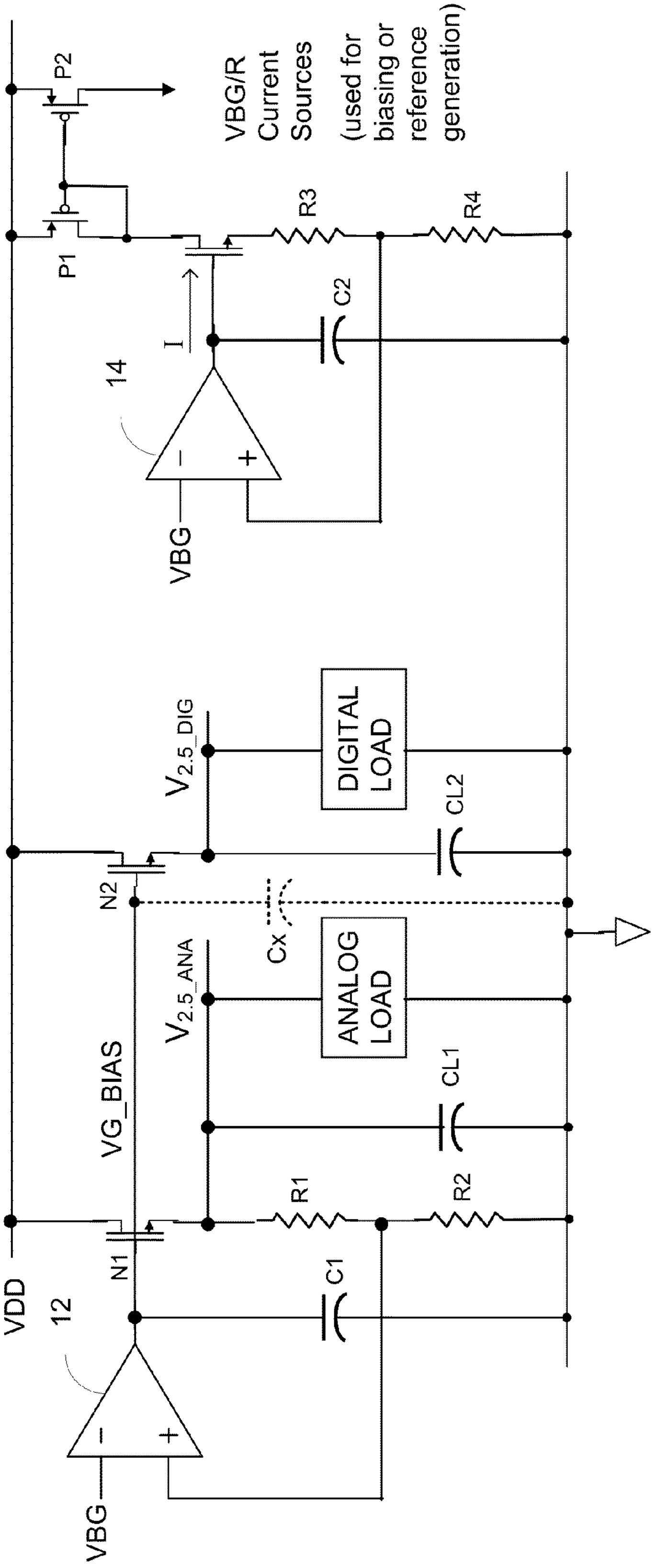
Fig. 1 (prior art)
FIG. 1 is a conventional design for a power supply section of a mixed signal IC.
Figure 2:
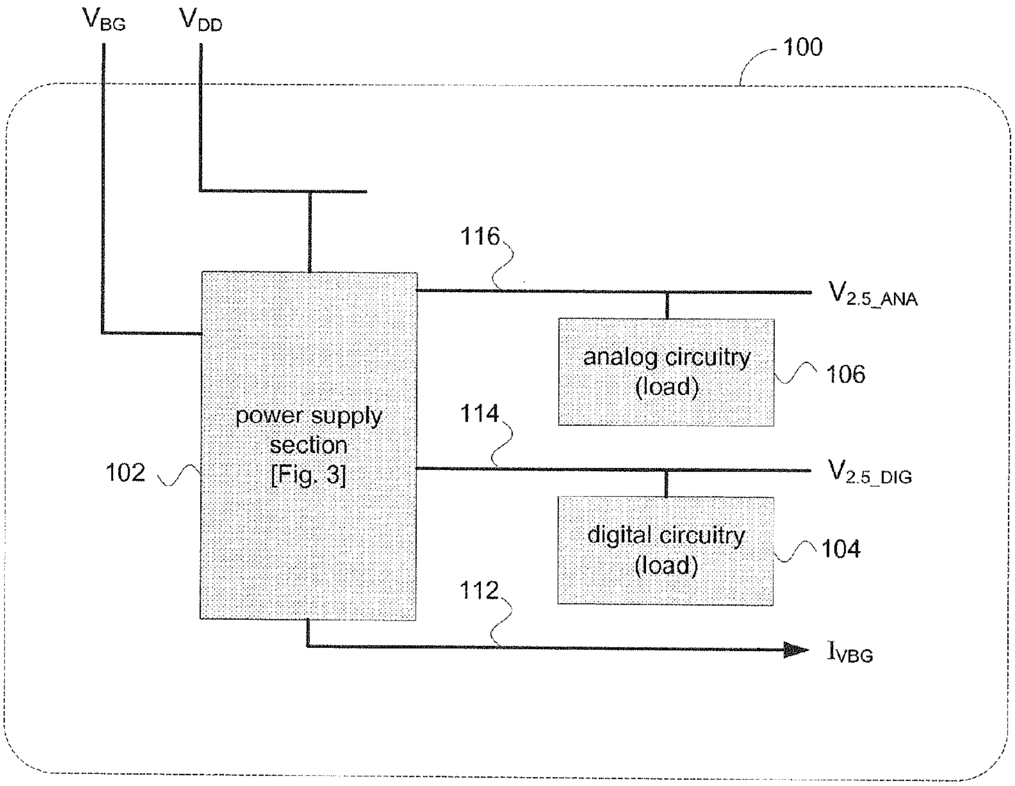
FIG. 2 represents a high level block diagram of a portion of a mixed signal IC in accordance with embodiments of the present disclosure.

Referring to FIG. 2, a linear regulator in accordance with embodiments of the present disclosure may be embodied in a mixed signal IC 100. The mixed signal IC 100 may include digital circuitry 104 and analog circuitry 106. A power supply section 102 in accordance with embodiments, may provide suitable drive voltages $V_{2.5\_DIG}$ (114) and $V_{2.5\_ANA}$ (116) to digital circuitry 104 and analog circuitry 106, respectively. The power supply section 102 may be powered by a power supply voltage $V_{DD}$, and produce drive voltages $V_{2.5\_DIG}$ and $V_{2.5\_ANA}$ referenced to a bandgap voltage $V_{BG}$. The power supply section 102 may also implement a current source to supply a current $I_{VBG}$ (112) that is proportional to the bandgap voltage $V_{BG}$. Typical levels for the drive voltages $V_{2.5\_DIG}$ and $V_{2.5\_ANA}$ are on the order of 2.5 V, but may be other values.

Figure 2A:
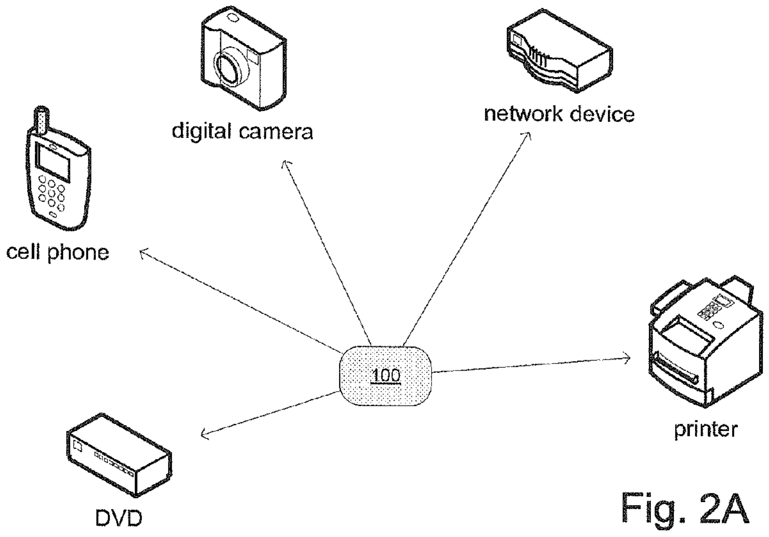
FIG. 2A illustrates some examples where a mixed signal IC in accordance with disclosed embodiments may be incorporated.

Referring to FIG. 2A, mixed signal ICs may be used in a wide variety of applications where analog functions and digital processes may be interrelated. For example, mixed signal ICs may be incorporated in consumer electronics devices such as cell phones, DVD players, digital cameras, in computer equipment such as printers, network devices, and so on.

Figure 3:
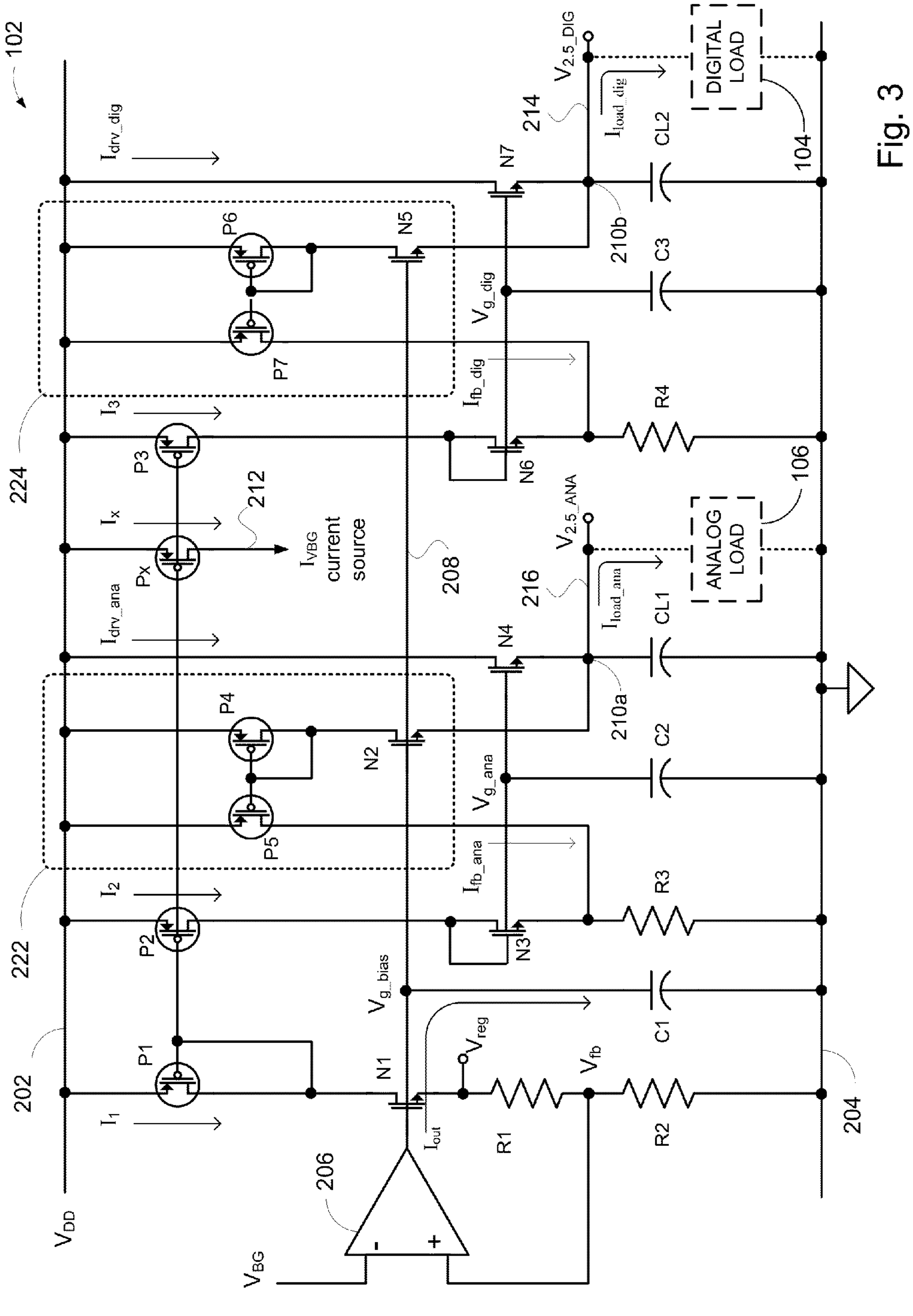
FIG. 3 represents a circuit diagram of a power supply section in accordance with embodiments of the present disclosure.

In some embodiments, the power supply section 102 may be configured as illustrated in FIG. 3. A first power supply rail 202 may be connected to a power supply voltage $V_{DD}$. A second power supply rail 204 may be connected to ground potential. A bandgap voltage reference $V_{BG}$ may be connected to an input of an op amp 206 to provide a regulated voltage level $V_{reg}$ that is referenced to the bandgap voltage. In an embodiment, the op amp 206 may be an operational transconductance amplifier (OTA) that outputs a current $I_{out}$ in response to the bandgap voltage $V_{BG}$ and a feedback voltage $V_{fb}$ provided by resistor network R1 and R2.

A bias capacitor CI may be charged by the current $I_{out}$ to set up a bias voltage $V_{g\_bias}$ on bias line 208. A transistor N1 configured as a source follower may be controlled by the bias voltage $V_{g\_bias}$ to conduct a current $I_1$ (source current) that is sourced from the power supply rail 202 and flows through the resistor network R1 and R2. The feedback loop comprising source follower N1 and resistors R1 and R2 provide the regulated voltage $V_{reg}$ across the resistors. The values of resistors R1 and R2 may be selected to produce a regulated voltage $V_{reg}$ that is suitable for driving the analog circuitry and/or the digital circuitry. Note that the source current $I_1$ is proportional to the bandgap voltage $V_{BG}$ for being a function of R1 and R2.

A. Driving an Analog Load

Consider first, circuitry in the power supply section 102 relating to driving the analog circuitry (load) 106. In some embodiments, transistors P1 and P2 may be configured as a current mirror P1/P2. The power supply rail 202 may sink the source current $I_1$ through the current mirror P1/P2 (in particular through transistor P1) and produce a mirrored current $I_2(=I_1)$ that flows through transistor P2. A portion of the mirrored current $I_2$ flows through diode-connected transistor N3 and resistor R3. Another portion of the mirrored current $I_2$ also flows into bias capacitor C2, charging the capacitor to set up a bias voltage $V_{g\_ana}$.

A transistor N4 may be used as a drive transistor that is configured as an open loop source follower to drive the analog circuitry 106. The transistor N4 is biased by the bias voltage $V_{g\_ana}$ to conduct a drive current $I_{drv\_ana}$ from the power supply rail 202. The drive current $I_{drv\_ana}$ charges a drive capacitor CL1 that is connected to a source terminal of transistor N4 to set up a drive voltage $V_{2.5\_ANA}$ at node 210*a* across the drive capacitor CL1. The drive voltage $V_{2.5\_ANA}$ may be applied to an analog terminal 216 which is connected to the analog circuitry 106.

The bias voltage $V_{g\_ana}$ and the drive voltage $V_{2.5\_ANA}$ are functions of bias voltage $V_{g\_bias}$ and regulated voltage $V_{reg}$. The regulated voltage $V_{reg}$ may therefore serve as a reference for producing the drive voltage $V_{2.5\_ANA}$.

The drive voltage $V_{2.5\_ANA}$ may be controlled to a value substantially equal to the regulated voltage $V_{reg}$. In some embodiments, the resistor R3 may be set to the sum of R1 and R2. Transistors N3 and N1 may be of the same size, and likewise, the transistors P2 and P1 may be of the same size. In such a configuration, the bias voltage $V_{g\_ana}$ across C1 is substantially equal to the level of the bias voltage $V_{g\_bias}$ across C2 by virtue of the selection of R3, N3, and P2. In addition, if the source follower transistors N4 and N1 are designed so that their current ratio is equal to their size ratio, then the generated drive voltage $V_{2.5\_ANA}$ likewise is substantially equal to the regulated voltage $V_{reg}$.

Depending on the particular requirements of the analog circuitry 106, the drive voltage $V_{2.5\_ANA}$ may be higher or lower than the regulated voltage $V_{reg}$. In some embodiments, the R3, N3, and P2 elements may be selected to produce a bias voltage $V_{g\_ana}$ that is greater than $V_{g\_bias}$ or less than $V_{g\_bias}$, thus producing a drive voltage $V_{2.5\_ANA}$ that is greater than or less than the regulated voltage $V_{reg}$ respectively. Nonetheless, $V_{2.5\_ANA}$ remains a function of $V_{reg}$. It can be appreciated that the drive voltage $V_{2.5\_ANA}$ may also be controlled by varying the designs of the source follower transistors N4 and N1.

The discussion will now turn to a description of the circuit 222. During operation of the analog circuitry 106, if the load condition in the analog circuitry is low, then the level of the drive voltage $V_{2.5\_ANA}$ is higher than the regulated voltage $V_{reg}$. For example, the drive voltage $V_{2.5\_ANA}$ may satisfy the following relation:

$$V_{2.5\_ana} \leq V_{g\_ana} + V_{gs4}$$

$$V_{g\_bias} = V_{reg} + V_{gs1},$$

where $V_{gs4}$ is the threshold voltage of transistor N4 and $V_{gs1}$ is the gate-source voltage of transistor N1, and $V_{g\_ana}$ is approximately equal to $V_{g\_bias}$ due to the selection of R3, N3, and P2.

However, if the load the analog circuitry 106 is sufficiently high, the drive voltage $V_{2.5\_ANA}$ may drop below $V_{reg}$. Since the source follower N4 is operating in an open loop ($V_{g\_ana}$ does not vary with $V_{2.5\_ANA}$), it cannot source additional current from the power supply rail 202 to compensate for the drop in the drive voltage $V_{2.5\_ANA}$, and operation of the analog circuitry 106 may be adversely affected.

In some embodiments, the power supply section 102 may include a local feedback loop 222 to compensate for occurrences when the drive voltage $V_{2.5\_ANA}$ drops below a threshold value. The local feedback loop 222 may include transistors P4 and P5 configured as a current mirror P4/P5. A sense transistor N2 may be connected in series with current mirror P4/P5. The sense transistor N2 may be biased by the bias voltage $V_{g\_bias}$ via bias line 208. The source terminal of transistor N2 may be connected to sense the level of the drive voltage $V_{2.5\_ANA}$. Under low loading conditions by the analog circuitry 106, the relation $(V_{g\_bias}-V_{2.5\_ANA})<V_{th}$ is true, where $V_{th}$ is the threshold voltage of the transistor N2. Accordingly, the transistor N2 is in cutoff mode and no current flows through the current mirror P4/P5.

Figure 3A:
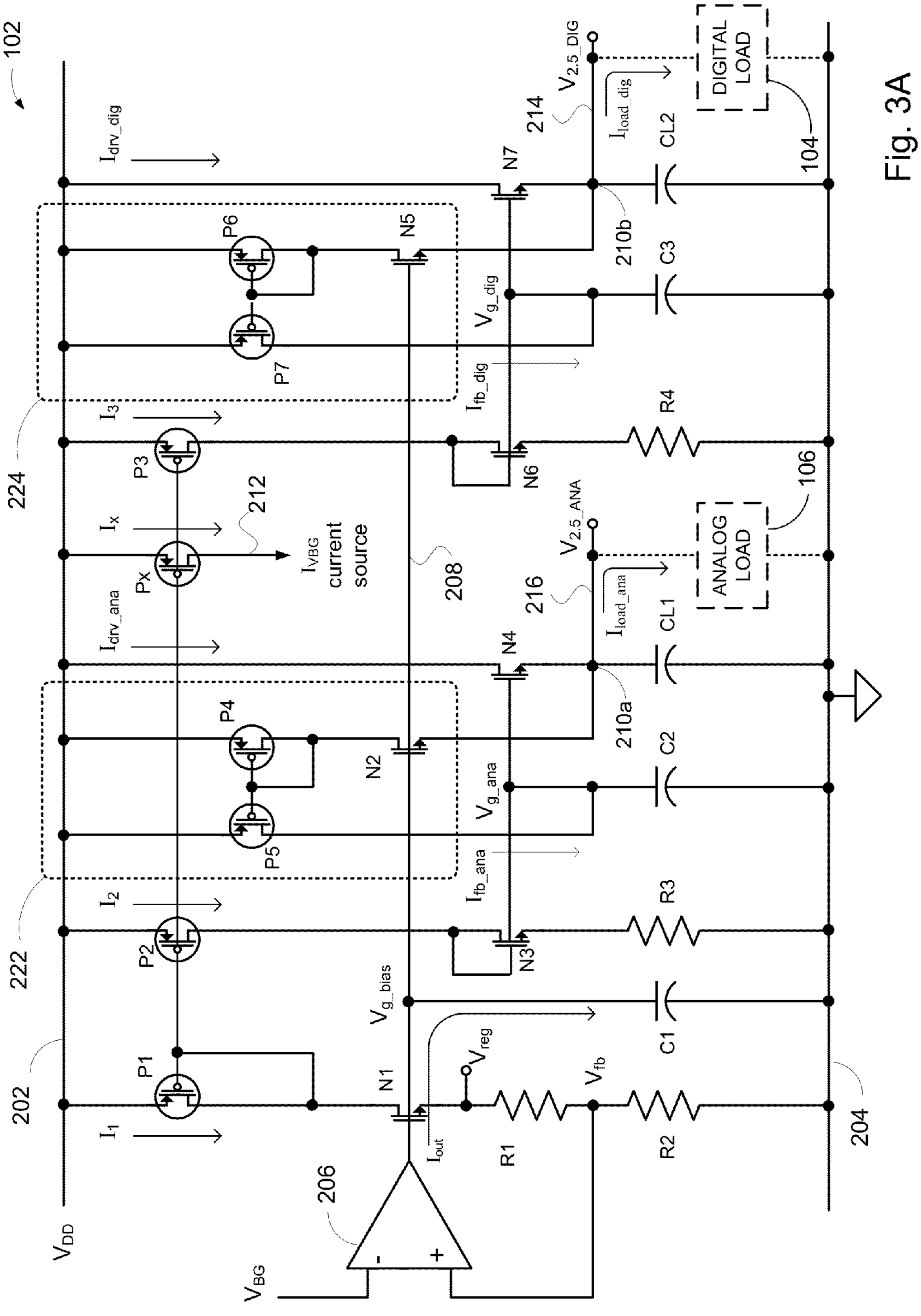
FIG. 3A shows an embodiment illustrating the feedback current from a local feedback loop can be connected directly to the source follower.

However, if $V_{2.5\_ANA}$ drops below $V_{reg}$ by an amount equal to or greater than $V_{th}$, then the difference $(V_{g\_bias}-V_{2.5\_ANA})$ will be greater than the voltage threshold and transistor N2 becomes conductive. Consequently, a portion of the load current $I_{load\_ana}$ flowing into the analog circuitry 106 will be sensed through transistor P4 and mirrored back via transistor P5 as a feedback current $I_{fb\_ana}$ into resistor R3. The increased voltage across R3 resulted from the mirrored current sourced through P5 increases the bias voltage $V_{g\_ana}$. Refer for a moment to FIG. 3A. In another embodiment, the mirrored current sourced through P5 can be connected directly to the capacitor C2, which would also increase $V_{g\_ana}$.

Returning to FIG. 3, the increase in $V_{g\_ana}$, in turn, controls transistor N4 to source additional current from the power supply rail 202 into capacitor C2, thus increasing the drive voltage $V_{2.5\_ANA}$. When the relation $(V_{g\_bias}-V_{2.5\_ANA})<V_{th}$ is once again satisfied, then transistor N2 turns off, the current mirror P4/P5 turns off, and $V_{g\_ana}$ is restored.

Operation of the feedback loop 222 therefore can restore the drive voltage $V_{2.5\_ANA}$ when the load of the analog circuitry 106 may otherwise cause the drive voltage to drop below an acceptable level. Moreover, operation of the transistor N2 provides for automatic cutoff of the feedback loop 222 when the drive voltage $V_{2.5\_ANA}$ is restored.

In embodiments, transients from the analog circuitry 106 are effectively isolated from the bias line 208 and thus the bias voltage $V_{g\_bias}$. Accordingly, a steady source current $I_1$ and consequently, a steady regulated voltage $V_{reg}$ may be achieved. Consider first, the drive transistor N4. The size of N4 is relatively large because it operates to drive the analog circuitry 106. Accordingly, CGS coupling between its source terminal and gate is high. Any transient from the analog circuitry 106 that may propagate to the terminal 216 will propagate to the source terminal of N4, and due to CGS coupling those transients may be strongly coupled to the gate terminal of N4. However, since the gate terminal is isolated from bias line 208 via the current mirror P1/P2, the transients will not propagate to the bias line 208. In addition, capacitor C2 may provide a degree of buffering of any transient that may appear on the gate terminal of N4.

Consider next the transistor N2. The size of the transistor N2 may be smaller than transistor N4 as N2 needs to act as a switch, while N4 must be large enough to drive the analog circuitry 106. Accordingly, the CGS effect in transistor N2 is small and so any transient that may propagate from the analog circuitry 106 to the source terminal of N2 will not be strongly coupled to the gate terminal of N2. Therefore, any transient that may be coupled to the gate terminal of N2, and hence onto bias line 208, may be small.

B. Driving a Digital Load

Consider next, circuitry in the power supply section 102 shown in FIG. 3 relating to driving the digital circuitry (load) 104. In some embodiments, transistors P1 and P3 may be configured as a current mirror P1/P3. The power supply rail 202 may sink current through the current mirror P1/P3 (in particular through transistor P1) and produce a mirrored current $I_3$ (=$I_1$) that flows through transistor P3. The mirrored current $I_3$ flows through diode-connected transistor N6 and resistor R4. The mirrored current $I_3$ also flows into bias capacitor C3, charging the capacitor to set up a bias voltage $V_{g\_dig}$.

A transistor N7 may be used as a drive transistor that is configured as an open loop source follower to drive the digital circuitry 104. The transistor N7 is controlled (biased) by the bias voltage $V_{g\_dig}$ to conduct a drive current $I_{drv\_dig}$ from the power supply rail 202. The drive current $I_{drv\_dig}$ charges a drive capacitor CL2 that is connected to a source terminal of transistor N7 to set up a drive voltage $V_{2.5\_dig}$ at node 210*b* across the drive capacitor CL2. The drive voltage $V_{2.5\_DIG}$ may be applied to a digital terminal 214 which is connected to the digital circuitry 104.

The bias voltage $V_{g\_dig}$ and the drive voltage $V_{2.5\_DIG}$ are functions of bias voltage $V_{g\_bias}$ and regulated voltage $V_{reg}$. As with $V_{2.5\_ANA}$, the regulated voltage $V_{reg}$ may also serve as a reference for producing the drive voltage $V_{2.5\_DIG}$.

The drive voltage $V_{2.5\_DIG}$ may be controlled to a value substantially equal to the regulator voltage $V_{reg}$. In some embodiments, the resistor R4 may be set to the sum of R1 and R2. Transistor N6 may be of the same size as transistor N1, and likewise, the transistor P3 may be of the same size as P1. In such a configuration, the bias voltage $V_{g\_dig}$ is substantially equal to the bias voltage $V_{g\_bias}$ by virtue of the selection of R4, N6, and P3. In addition, if the current ratio of the source follower transistor N7 and the transistor N1 is equal to their size ratio, then the generated drive voltage $V_{2.5\_DIG}$ likewise is substantially equal to the regulated voltage $V_{reg}$.

Depending on the particular requirements of the digital circuitry 104, the drive voltage $V_{2.5\_DIG}$ may be set higher or lower than the regulated voltage $V_{reg}$. In some embodiments, the R4, N6, and P3 elements may be selected to produce a bias voltage $V_{g\_dig}$ that is greater than $V_{g\_bias}$ or less than $V_{g\_bias}$ thus producing a drive voltage $V_{2.5\_DIG}$ that is greater than or less than the regulated voltage $V_{reg}$ respectively. Nonetheless, $V_{2.5\_DIG}$ remains a function of $V_{reg}$. It can be appreciated that the drive voltage $V_{2.5\_DIG}$ may also be adjusted by varying the designs of the source follower transistor N7 relative to N1.

The discussion will now turn to a description of the circuit 224. During operation of the digital circuitry 104, if the load condition in the digital circuitry is low, then the drive voltage $V_{2.5\_DIG}$ is higher than the regulated voltage $V_{reg}$. For example, the drive voltage $V_{2.5\_DIG}$ may satisfy the following relation:

$$V_{2.5\_dig} \leq V_{g\_dig} + V_{gs7}$$

$$V_{g\_bias} = V_{reg} + V_{gs1},$$

where $V_{gs7}$ is the threshold voltage of transistor N7 and $V_{gs1}$ is the gate-source voltage of transistor N1, and $V_{g\_dig}$ is approximately equal to $V_{g\_bias}$ due to the selection of R4, N6, and P3.

However, if loading in the digital circuitry 104 is sufficiently high, the drive voltage $V_{2.5\_DIG}$ may drop below $V_{reg}$. Since the source follower N7 is operating in an open loop ($V_{g\_dig}$ does not vary with $V_{2.5\_DIG}$), it cannot source additional current from the power supply rail 202 to compensate for the drop in the drive voltage $V_{2.5\_DIG}$, and operation of the digital circuitry 104 may be adversely affected.

In some embodiments, the power supply section 102 may include a local feedback loop 224 to compensate for the occurrences when the drive voltage $V_{2.5\_DIG}$ drops below a threshold value. The local feedback loop 224 may include transistors P6 and P7 configured as a current mirror P6/P7. A sense transistor N5 may be connected in series with current mirror P6/P7. The sense transistor N5 may be biased by the bias voltage $V_{g\_bias}$ on bias line 208. The source terminal of transistor N5 may be connected to sense the drive voltage $V_{2.5\_DIG}$. Under low loading conditions by the digital circuitry 104, the relation $(V_{g\_bias} - V_{2.5\_DIG}) < V_{th}$ is true, where $V_{th}$ is the threshold voltage of the transistor N5. Accordingly, the transistor N5 is in cutoff mode and no current flows through the current mirror P6/P7.

However, if $V_{2.5\_DIG}$ drops below $V_{reg}$ by an amount equal to or greater than $V_{th}$, then the difference $(V_{g\_bias} - V_{2.5\_DIG})$ will greater than the voltage threshold and transistor N5 becomes conductive. Consequently, a portion of the load current $I_{load\_dig}$ flowing into the digital circuitry 104 may be sensed through transistor P6 and mirrored back via transistor P7 as a feedback current $I_{fb\_dig}$ into resistor R4. The increased voltage drop across R4 resulted from the mirrored current sourced through P6 increases the bias voltage $V_{g\_dig}$. Refer for a moment to FIG. 3A. In another embodiment, the mirrored current sourced through P7 can be connected directly to the capacitor C3, which would also increase $V_{g\_dig}$.

Returning to FIG. 3, the increase in $V_{g\_dig}$, in turn, controls transistor N7 to source additional current from the power supply rail 202 into capacitor C3, thus increasing the drive voltage $V_{2.5\_DIG}$. When the relation $(V_{g\_bias} - V_{2.5\_DIG}) < V_{th}$ is once again satisfied, then transistor N5 turns off, the current mirror P6/P7 turns off, and $V_{g\_dig}$ is restored.

Operation of the feedback loop 224 therefore can restore the drive voltage $V_{2.5\_DIG}$ when loading by the digital circuitry 104 may otherwise cause the drive voltage to drop below an acceptable level. Moreover, operation of the transistor N5 provides for automatic cutoff of the feedback loop 224 when the drive voltage $V_{2.5\_DIG}$ is restored.

In embodiments, transients from the digital circuitry 104 are effectively isolated from bias line 208 and thus the bias voltage $V_{g\_bias}$. Accordingly, a steady source current $I_1$ and consequently, a steady regulated voltage $V_{reg}$ may be achieved. Consider first, the drive transistor N7. The size of N7 is relatively large because it operates to drive the digital circuitry 104. Accordingly, CGS coupling between its source terminal and gate is high. Any transient from the digital circuitry 104 that may propagate to the terminal 214 will propagate to the source terminal of N7, and due to CGS coupling those transients may be strongly coupled to the gate terminal of N7. However, since the gate terminal is isolated from the bias line 208 via the current mirror P1/P3, the transients will not propagate to the bias line 208. In addition, capacitor C3 may provide a degree of buffering of any transient that may appear on the gate terminal of N7.

Consider next the transistor N5. The size of the transistor N5 may be small relative to the larger transistor N7 as N5 needs to act as a switch, while N7 must be large enough to drive the digital circuitry 104. Accordingly, the CGS effect in transistor N5 is small and so any transient that may propagate from the digital circuitry 104 to the source terminal of N5 will not be strongly coupled to the gate terminal of N5. Therefore, any transient that may be coupled to the gate terminal of N5, and hence onto bias line 208, may be small.

C. Current Source

In some embodiments, the power supply section 102 may include a current source which can provide a stable current that is proportional to the bandgap voltage $V_{BG}$ and which can be used for biasing or generating a reference current. FIG. 3 shows a current mirror circuit defined by transistors P1 and Px. The current mirror produces a mirrored current $I_x$ that mirrors the source current $I_1$. The mirrored current $I_x$ is provided to the terminal 212, which can then be output as a current $I_{VBG}$ that is proportional to the bandgap voltage $V_{BG}$. Since the biasing of transistor N1 is isolated from any transient that may be created by digital and analog circuitry 104, 106, a clean current source (namely, current mirror P1/Px) may be provided.

Figure 4:
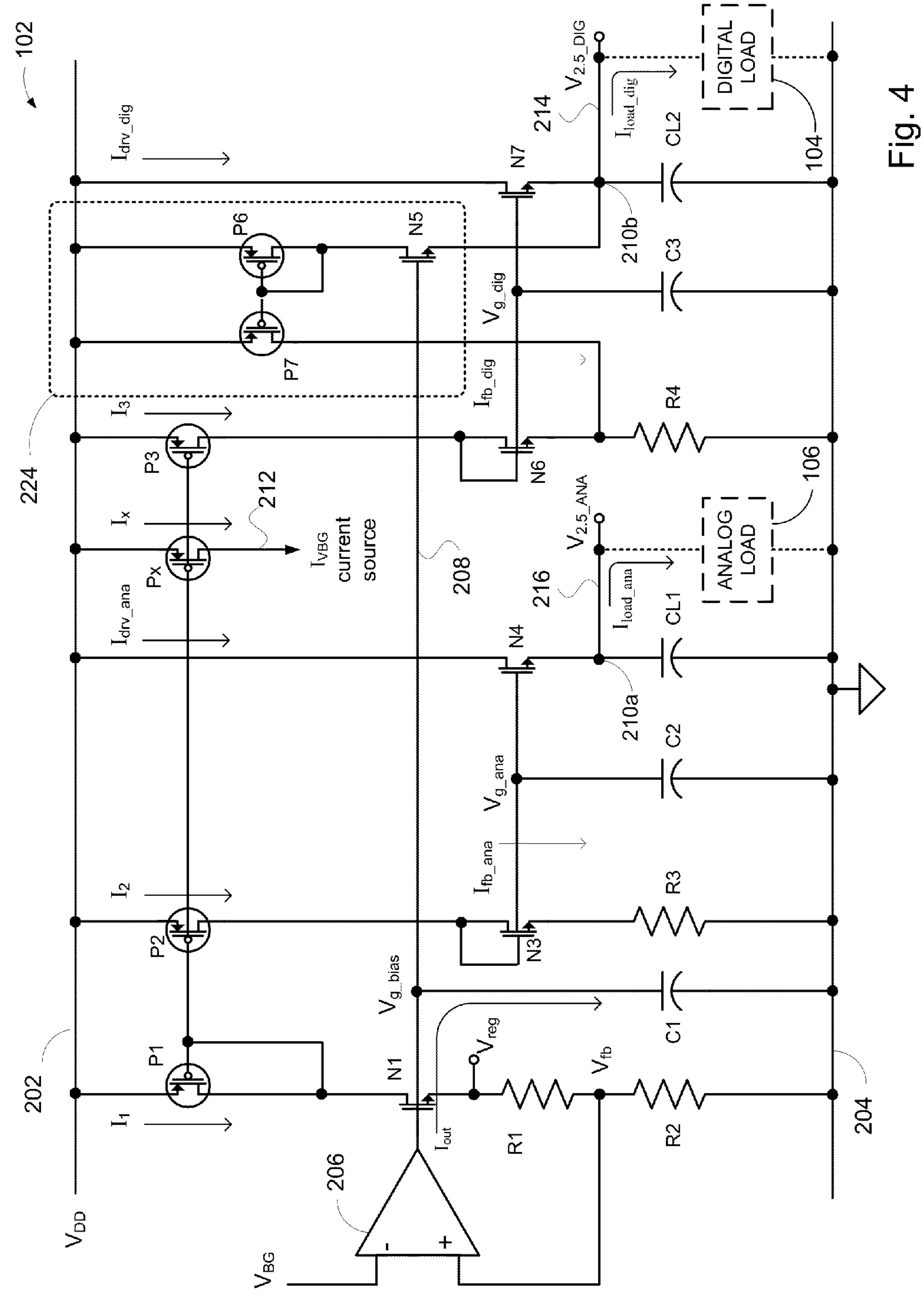
FIG. 4 represents an example of embodiments of a power supply section that omits local feedback for the analog drive voltage.
Figure 4A:
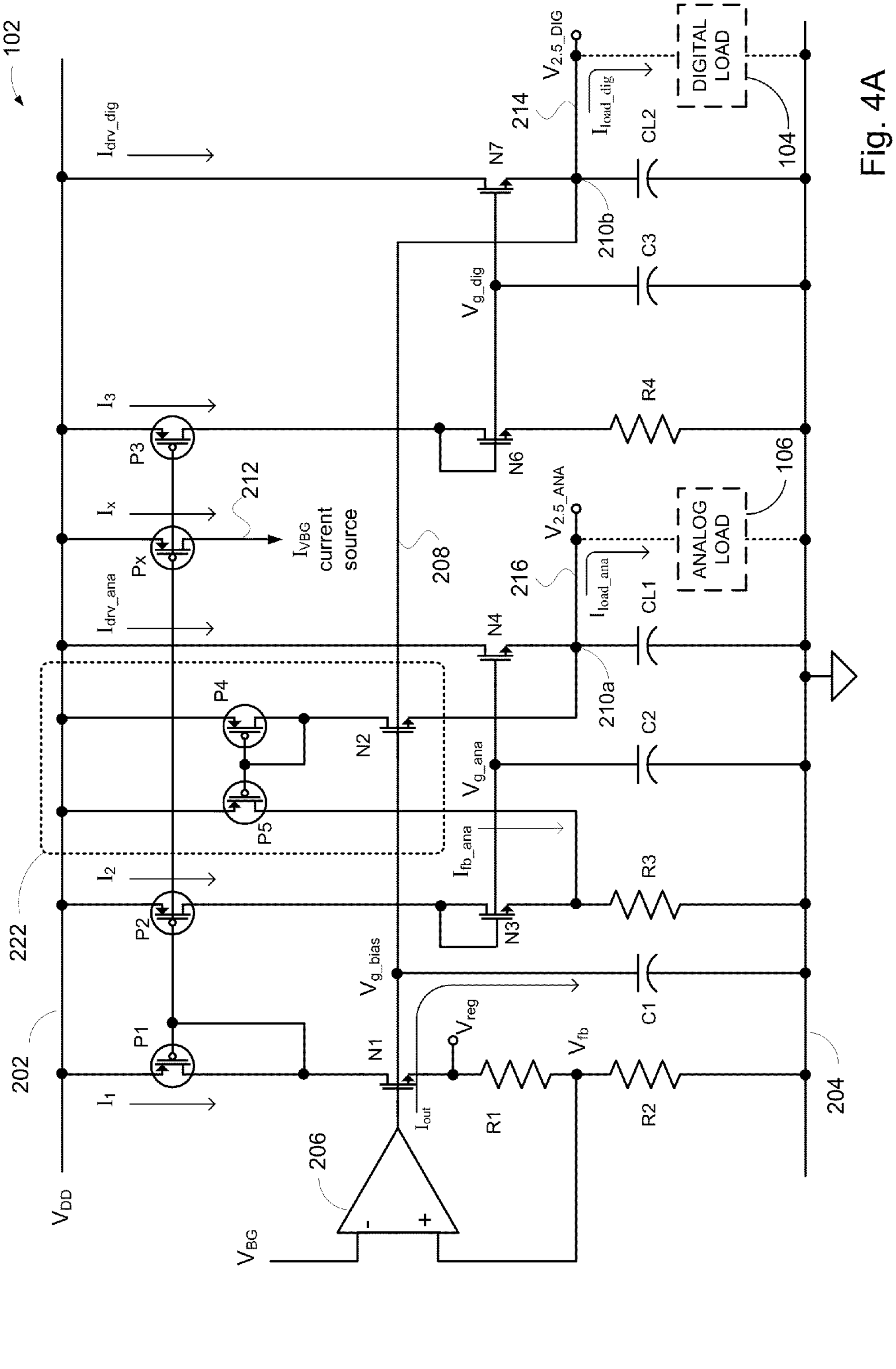
FIG. 4A represents an example of embodiments of a power supply section that omits local feedback for the digital drive voltage.

Referring to FIG. 4, in some embodiments the feedback loop 222 may be omitted from the power supply section 102. Embodiments represented by FIG. 4 may be suitable where heavy loading by the analog circuitry 106 is not likely to be encountered. In such a situation, the drive voltage $V_{2.5\_ANA}$ can remain sufficiently constant such that compensation provided by the feedback loop 222 shown in FIG. 3 may be omitted. Accordingly, the current mirror P4/P5 and the transistor N2 may be omitted as shown in FIG. 4. Referring to FIG. 4A, in some other embodiments the feedback loop 224 may be omitted from the power supply section 102 in a similar manner. Accordingly, the current mirror P6/P7 and the transistor N5 may be omitted as shown in the figure. It can be appreciated that in some other embodiments, both feedback loops 222 and 224 may be omitted.

Figure 5:
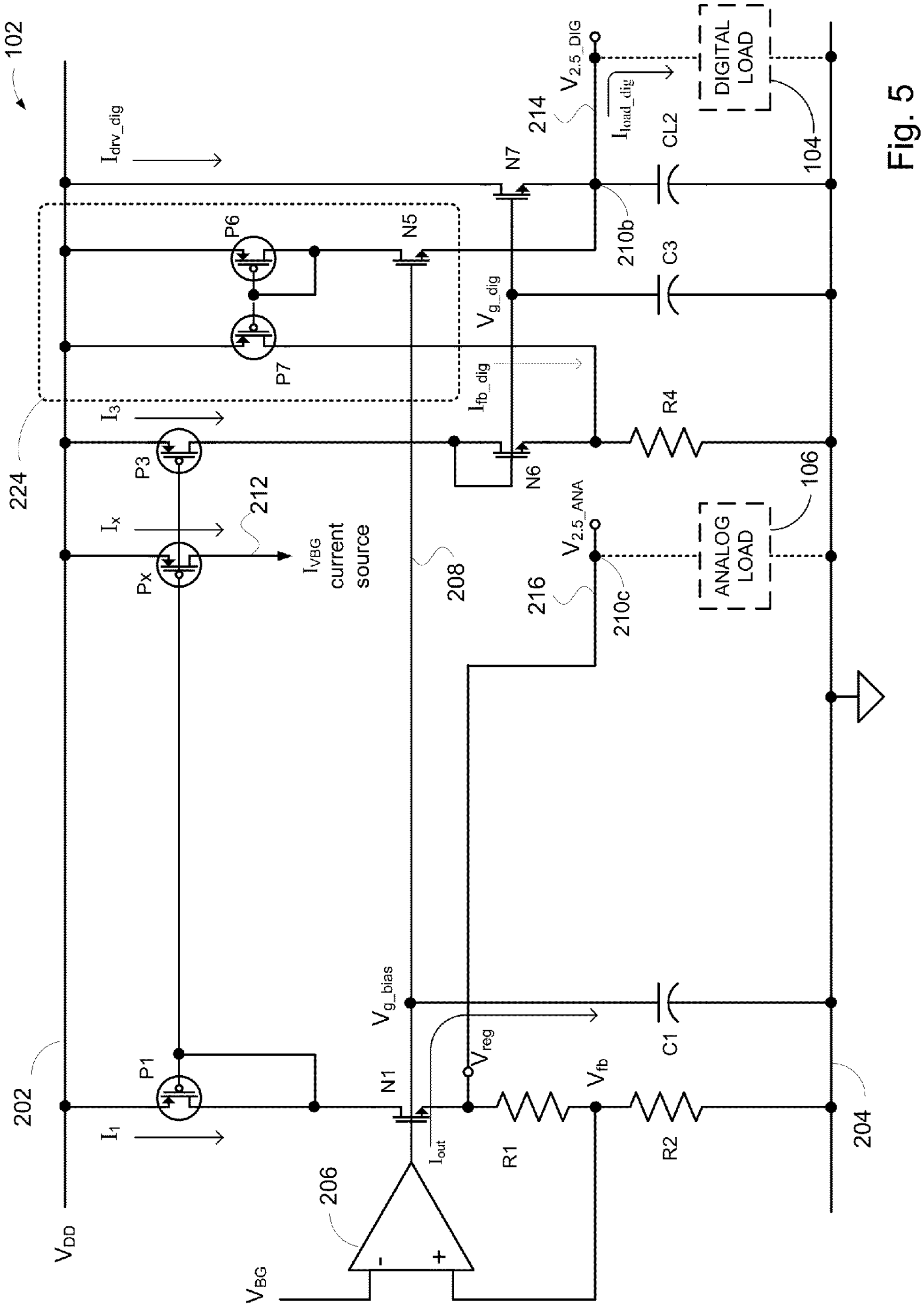
FIG. 5 represents an example embodiment of a power supply section where the analog drive voltage is directly tapped from the regulated voltage and local feedback is omitted.

Referring to FIG. 5, the circuit elements that produce the drive voltage $V_{2.5\_ANA}$ may be omitted from an embodiment of the power supply section 102 in addition to the feedback loop 222. In some embodiments the drive voltage $V_{2.5\_ANA}$ for the analog circuitry 104 may be produced directly from the regulated voltage $V_{reg}$. FIG. 5 shows an embodiment of the power supply section 102 in which the regulated voltage $V_{reg}$ may be connected directly to the terminal 216 at node 210*c* to produce the drive voltage $V_{2.5\_ANA}$ at the terminal. Accordingly, the circuitry elements transistor P2 from the current mirror P1/P2, transistors N3 and N4, resistor R3, and capacitor C2 may be omitted as shown in the figure.

Embodiments represented by FIG. 5 may be suitable where the analog circuitry 106 is not likely to produce transients that require isolation of the analog circuitry (the feedback loop 222 may be omitted).

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents will be evident to those skilled in the art and may be employed without departing from the spirit and scope of the disclosure as defined by the claims.

What is claimed is:

1. A method in an electrical circuit comprising:
- receiving a power supply voltage;
- receiving a reference voltage;
- producing a source current from the power supply voltage, the source current being proportional to the reference voltage;
- producing a first drive voltage that is based on the source current;
- applying the first drive voltage to an analog terminal configured for connection to an analog load;
- producing a second drive voltage that is based on the source current, including:
  - mirroring the source current to produce a first mirrored current; and
  - controlling a first transistor, which is connected to the power supply voltage, with the first mirrored current to produce the second drive voltage; and
- applying the second drive voltage to a digital terminal configured for connection to a digital load.

2. The method of claim 1 further comprising:
- sensing a voltage of the digital terminal; and
- further controlling the first transistor to compensate the second drive voltage in response to the sensed voltage of the digital terminal.

3. The method of claim 1 wherein producing the first drive voltage includes:
- mirroring the source current to produce a second mirrored current; and
- controlling a second transistor, which is connected to the power supply voltage, with the second mirrored current to produce the first drive voltage.

4. The method of claim 3 further comprising:
- sensing a voltage of the analog terminal; and
- compensating the first drive voltage in response to the sensed voltage of the analog terminal including further controlling the second transistor with the sensed voltage of the analog terminal.

5. The method of claim 1 wherein mirroring the source current to produce a first mirrored current includes sinking the source current through a first current mirror circuit to produce the first mirrored current, wherein the first mirror current circuit comprises a pair of transistors.

6. The method of claim 1 further comprising:
- mirroring the source current to produce a second mirrored current; and
- outputting the second mirrored current at a current source terminal.

7. The method of claim 1 wherein the reference voltage is equal to a bandgap voltage.

8. A circuit comprising:
- a power supply voltage line configured for connection to a power supply voltage;
- a first terminal configured for connection to an analog load;
- a second terminal configured for connection to a digital load;
- a first circuit having an input configured to receive a reference voltage and configured to produce an output voltage based on the reference voltage;
- a first source follower connected to an output of the first circuit and configured to control, in response to the output voltage of the first circuit, a source current produced from the power supply voltage line that is proportional to the reference voltage;
- a second circuit that is
  - connected to the first source follower,
  - has a node connected to the first terminal, and
  - configured to produce at the node a first drive voltage from the source current, thereby driving the analog load with the first drive voltage;
- a third circuit connected to the first source follower and configured to produce at an output thereof a mirrored current that mirrors the source current;
- a second source follower connected between the power supply line and the second terminal, the second source follower having a connection to the output of the third circuit and configured to produce at the second terminal a second drive voltage responsive to the mirrored current.

9. The circuit of claim 8 further comprising a fourth circuit connected between the power supply voltage line and the second terminal and configured to produce an output current that depends on a difference between the output voltage of the first circuit and a voltage of the second terminal, the second source follower further configured to produce the second drive voltage responsive to both the mirrored current of the third circuit and the output current of the fourth circuit.

10. The circuit of claim 9 wherein the fourth circuit includes a transistor that is biased by the output voltage of the first circuit and has a connection to the second terminal, the transistor configured to control the mirrored current based on the difference between the output voltage of the first circuit and a voltage of the second terminal.

11. The circuit of claim 9 wherein an output of the fourth circuit is connected to the second source follower.

12. The circuit of claim 8, wherein the second circuit comprises:
- a fourth circuit connected to the first source follower and configured to produce at an output of the fourth circuit a mirrored current that mirrors the source current; and
- a third source follower connected between the power supply line and the first terminal, the third source follower having a connection to the output of the fourth circuit and configured to produce at the first terminal the first drive voltage responsive to the control current.

13. The circuit of claim 12 further comprising a fifth circuit connected between the power supply voltage line and the first terminal and configured to produce an output current that depends on a difference between the output voltage of the first circuit and a voltage of the first terminal, the third source follower further configured to produce the first drive voltage responsive to both the mirrored current of the fourth circuit and the output current of the fifth circuit.

14. The circuit of claim 13 wherein the fifth circuit includes a transistor that is biased by the output voltage of the first circuit and has a connection to the first terminal, the transistor configured to control the mirrored current based on the difference between the output voltage of the first circuit and the voltage of the first terminal.

15. The circuit of claim 13 wherein an output of the fifth circuit is connected to the third source follower.

16. The circuit of claim 8 wherein the first circuit comprises:

an operational amplifier having a first input, a second input, and an amplifier output;

a capacitor connected to the amplifier output; and a resistor network connected to sink the source current from the first source follower, the resistor network having a connection to the second input of the operational amplifier, wherein the input of the first circuit is connected to the first input of the amplifier, wherein the output of the first circuit is connected to amplifier output, and wherein the output voltage of the first circuit is a voltage across the capacitor.

17. The circuit of claim 8, wherein the first circuit comprises:

an operational amplifier having a first input, a second input, and an amplifier output; and a capacitor connected to the amplifier output, wherein the input of the first circuit is the first input of the operational amplifier, wherein the output voltage of the first circuit is a voltage across the capacitor, wherein the second circuit comprises a resistor network connected to sink the source current from the first source follower, the resistor network having a first connection and a second connection, wherein the first connection of the resistor network is connected to the second input of the operational amplifier, wherein the second connection of the resistor network is connected to the node of the second circuit, wherein the first drive voltage is a voltage at the second connection of the resistor network.

18. A circuit comprising:

means for providing a power supply voltage;

means for producing a source current from the power supply voltage, the source current being proportional to a level of the reference voltage;

means for producing at an analog terminal a first drive voltage that is based on the source current, the analog terminal being configured for connection to an analog load;

means for mirroring the source current to produce a first mirrored current; and means for controlling a first transistor that is connected to the power supply voltage with the first mirrored current to produce a second drive voltage at a digital terminal configured for connection to a digital load.

19. The circuit of claim 18 further comprising:

means for sensing a voltage level of the digital terminal; and means for further controlling the first transistor to change a level of the second drive voltage in response to a voltage sensed level of the digital terminal.

20. The circuit of claim 18 wherein the means for producing the first drive voltage includes:

means for mirroring the source current to produce a second mirrored current;

and means for controlling a second transistor, which is connected to the power supply voltage, with the second mirrored current to produce the first drive voltage, the circuit further comprising:

means for sensing a voltage level of the analog terminal; and means for further controlling the second transistor with the sensed voltage level of the analog terminal to change a level of the first drive voltage.

* * * * *